Figure 1:
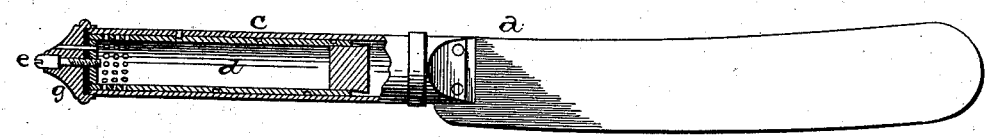
Figure 2:
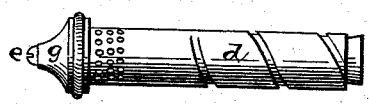

R. W. & R. F. F. BROWN.
Combined Knives and Pepper-Boxes.

No. 149,833. Patented April 21, 1874.

Witnesses:
J. W. Garner
Edwd. Kaiser

Inventors.
R. W. Brown
R. F. F. Brown
per
F. A. Lehmann, Atty

UNITED STATES PATENT OFFICE.

RUSSELL W. BROWN AND ROBERT F. F. BROWN, OF UTICA, NEW YORK.

IMPROVEMENT IN COMBINED KNIVES AND PEPPER-BOXES.

Specification forming part of Letters Patent No. 149,833, dated April 21, 1874; application filed March 9, 1874.

*To all whom it may concern:*

Be it known that we, RUSSELL W. BROWN and ROBT. F. F. BROWN, of Utica, in the county of Oneida and State of New York, have invented certain new and useful Improvements in Combined Knives and Pepper-Boxes; and we do hereby declare the following to be a full, clear, and exact description of the invention, such as will enable others skilled in the art to which it pertains to make and use it, reference being had to the accompanying drawings, which form part of this specification.

The nature of our invention relates to an improvement in combined knives and pepper-boxes; and it consists in making the handles hollow, so as to receive a pepper or salt box, which are made with one end open, through which they are filled, and have a number of apertures through their opposite end at the top of the handle, through which apertures their contents are shaken. The boxes are made to screw or slide into the handles, so that they can be conveniently handled.

The accompanying drawings represent our invention.

$a$ represents an ordinary knife or fork, the handle of which is made from a single block, or in parts or pieces of any suitable material, and secured to the blade or shank of the fork in any desired manner. These handles, $c$, are made hollow, so as to receive a salt or pepper box, $d$, which are made to slide back and forth in the handle by means of screw, as here shown, by a bayonet-joint, or by any other suitable means that may be preferred. The inner ends of the boxes are so made as to receive either pepper or salt, while the outer ends are closed, with the exception of a screw-hole to receive the screw $e$, by which the cap $g$ is secured in place. Around the upper rims of the boxes there are formed a number of apertures, so that by drawing the box a little piece out its contents can be shaken over the edibles; and in practice there will usually be salt in the fork and pepper in the knife, or vice versa, and the contents of the box labeled on the outside of the handle. In the under side of the cap $g$ is formed a recess, into which a packing of rubber or other material is placed, so as to form a tight joint at the junction of the cap and handle, to prevent any of the contents of the pepper or salt box from escaping between them. From the inside of the cap there also projects a stud, which catches in the top of the box and prevents the cap from turning around and working loose.

These knives and forks are especially intended for use at picnics, clam-bakes, camps, &c., where such conveniences as salt and pepper boxes are very rarely found.

Having thus described our invention, we claim—

1. A knife or fork having a hollow handle and provided with a removable salt or pepper box, substantially as set forth.
2. The combination of a hollow handle, $c$, salt or pepper box $d$, cap $g$, and a packing, substantially as shown.
3. The combination of the pepper or salt box $d$, having a spiral groove around its side, and open at its inner end, with the handle $c$, provided with a stud to catch in the groove of the box, substantially as specified.

In testimony that we claim the foregoing we have hereunto set our hands this 5th day of March, 1874.

RUSSELL W. BROWN.
ROBERT F. F. BROWN.

Witnesses:
E. B. HARTING,
M. VAN AUKEN.